(12) United States Patent
Bell et al.

(10) Patent No.: US 10,809,079 B2
(45) Date of Patent: Oct. 20, 2020

(54) NAVIGATIONAL AID FOR THE VISUALLY IMPAIRED

(71) Applicant: Ford Global Technologies, LLC, Dearborn, MI (US)

(72) Inventors: Donna Bell, Southfield, MI (US); Sarah Houts, Sunnyvale, CA (US); Lynn Valerie Keiser, San Carlos, CA (US); Jinhyoung Oh, Fremont, CA (US); Gaurav Pandey, Foster City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 16/112,152

(22) Filed: Aug. 24, 2018

(65) Prior Publication Data

US 2020/0064141 A1    Feb. 27, 2020

(51) Int. Cl.
*G01C 21/34* (2006.01)
*G01C 21/36* (2006.01)
(Continued)

(52) U.S. Cl.
CPC ......... *G01C 21/3415* (2013.01); *A41D 1/002* (2013.01); *A41D 1/04* (2013.01);
(Continued)

(58) Field of Classification Search
CPC ............ G01C 21/3415; G01C 21/3652; G01C 21/3629; G09B 21/003
See application file for complete search history.

(56) References Cited

U.S. PATENT DOCUMENTS

2013/0218456 A1    8/2013   Zelek et al.
2016/0038083 A1    2/2016   Ding et al.
(Continued)

FOREIGN PATENT DOCUMENTS

CN    105662796 A    6/2016
KR    20180013353 A    2/2018

OTHER PUBLICATIONS

Xiao, Jizhong et al., An assistive Navigation Framework for the Visually Impaired, Oct. 2015, IEEE, Transactions on Human Machine Systems vol. 45 No. 5 (Year: 2015).*
(Continued)

*Primary Examiner* — Alan D Hutchinson
*Assistant Examiner* — Andy Schneider
(74) *Attorney, Agent, or Firm* — Brandon Hicks; Eversheds Sutherland (US) LLP

(57) ABSTRACT

Systems, methods, and apparatuses are disclosed for providing routing and navigational information to users (e.g., visually handicapped users). Example methods may include determining, by one or more computer processors coupled to at least one memory, a first location of a user device and an orientation of a user device, and generating a first route based on the first location, the first orientation, and a destination location. Further, the method may include determining one or more obstacles on the first route using data corresponding to visual information and one or more artificial intelligence techniques; and generating a second route based on the one or more obstacles detected on the first route.

18 Claims, 8 Drawing Sheets

(51) Int. Cl.
  *G09B 21/00* (2006.01)
  *G01S 19/13* (2010.01)
  *A41D 1/00* (2018.01)
  *A41D 1/04* (2006.01)

(52) U.S. Cl.
  CPC ..... *G01C 21/3602* (2013.01); *G01C 21/3629* (2013.01); *G01C 21/3652* (2013.01); *G01S 19/13* (2013.01); *G09B 21/003* (2013.01)

(56) References Cited

U.S. PATENT DOCUMENTS

| 2016/0163165 A1* | 6/2016 | Morrell | H04L 12/1895 |
| | | | 340/407.1 |
| 2018/0189567 A1* | 7/2018 | Maheriya | G06T 7/536 |
| 2018/0268670 A1* | 9/2018 | Gabbay | G08B 7/066 |

OTHER PUBLICATIONS

United States Department of Transportation, Technological Innovations in Transportation for People with Disabilities, Feb. 23, 2011, United States Department of Transportation, pp. 4-9 (Year: 2011).*

* cited by examiner

10,809,079 B2

NAVIGATIONAL AID FOR THE VISUALLY IMPAIRED

TECHNICAL FIELD

The present disclosure relates to systems, methods, and computer-readable media for providing navigational aid, and in particular, for providing navigational aid for the visually impaired.

BACKGROUND

Individuals suffering from visual disabilities have many difficulties navigating in a given environment. For example, walking from a given location to a destination may be a difficult and dangerous task for such individuals, particularly in city environments. Walking canes and seeing-eye dogs are helpful for avoiding some obstacles but may not address the broader issue of providing navigation and situational awareness. Moreover, information needed by the visually impaired in navigating certain environments (e.g., streets, subways, train stations, and the like) may not be readily available in a form that such individuals may understand. Further, orientation and navigation information may take on diverse forms and be generally complex, and as such, may not be particularly helpful for such individuals.

DETAILED DESCRIPTION

Figure 1:
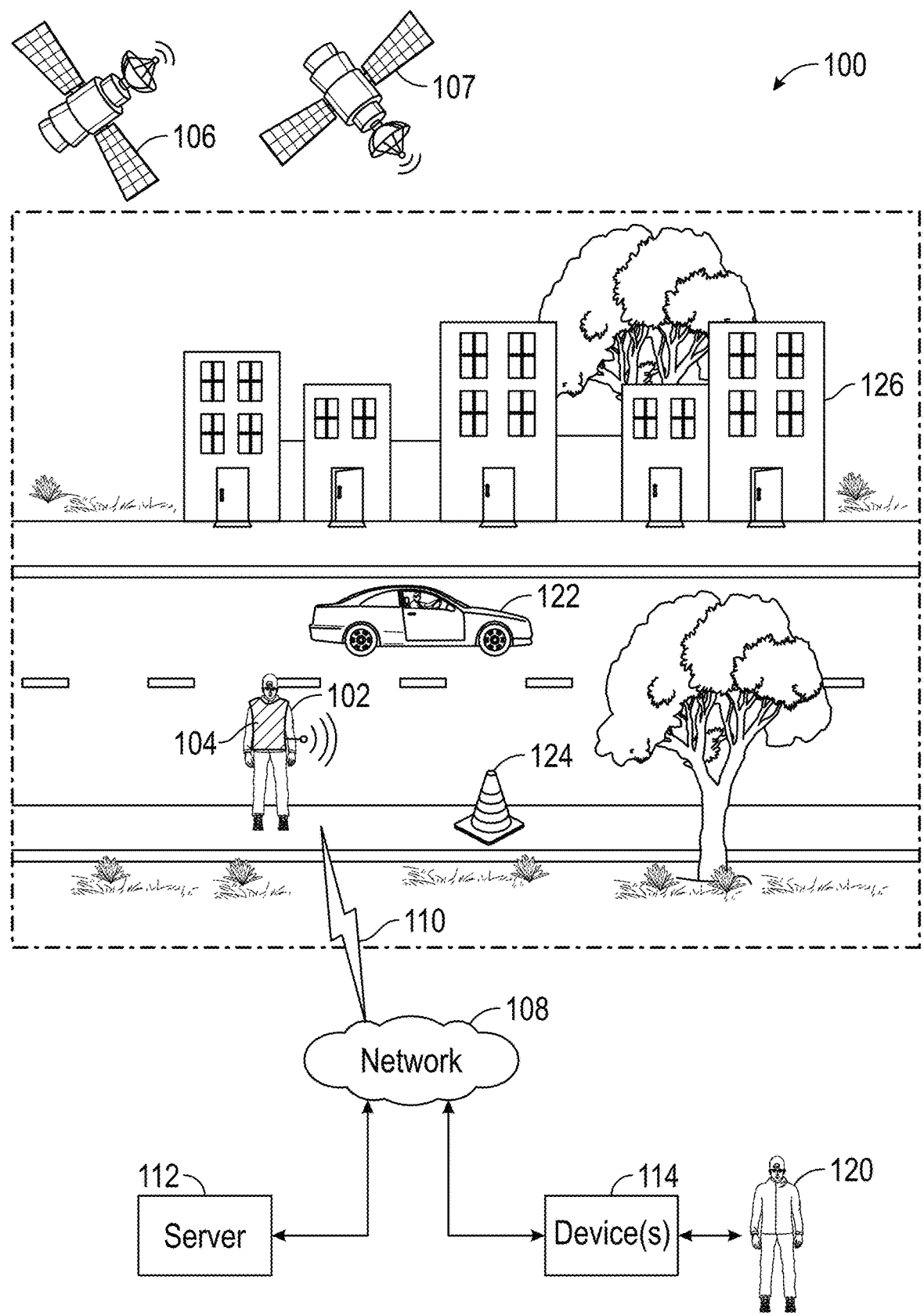
FIG. 1 shows a diagram of an example environment for the use of the garment, in accordance with example embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In various embodiments, the systems, methods, and apparatuses disclosed herein may use maps (e.g., pre-generated, high-definition (HD) maps) having obstacle data (e.g., data associated with dynamically/real-time generated obstacles in a given environment), to provide navigable, up-to-date routes to a user (e.g., a visually impaired user). In another aspect, an article of clothing such as a garment (e.g., a wearable vest) may be configured to include or associate with one or more devices (e.g., a user's device such as a phone, one or more cameras, one or more location receivers such as global positioning sensor (GPS) receivers, ultrasonic sensor(s), microcontrollers, speakers, microphones and the like) that can be used to receive route information, provide obstacle information to one or more servers for updating the HD maps, and provide navigation instructions (e.g., audio instructions) to the user, for example, using an application on the users device (e.g., user phone). In another aspect, the garment and/or the associated devices (e.g., the phone, one or more cameras, one or more location receivers such as global positioning sensor (GPS) receivers, ultrasonic sensor(s), microcontrollers, speakers, microphones, etc.) may be configured and trained by the user prior, during, and after navigating on given routes.

In another embodiment, the maps may include certain features and details that may not be found in conventional navigational maps. For example, the maps (e.g., HD maps) may include one or more static obstacles associated with an infrastructural element of an environment, for example, street lamps, poles, mailboxes, bus stops, fire hydrants, and the like. Moreover, the maps may be updated with data that represents non-static obstacles (e.g., dynamic obstacles such as traffic cones, construction sites, vehicles, debris, and the like).

In another embodiment, the maps (e.g., HD maps) may be generated and periodically updated using data provided by one or more vehicles (e.g., autonomous vehicles) in addition to dynamic obstacle data provided by one or more users (e.g., via the garment). In another aspect, the vehicles may have one or more perception sensors (e.g., cameras, LiDAR, global positioning sensors (GPSs), inertial measurement units (IMUs), radars and the like) providing environmental and traffic data. As noted, in another embodiment, the maps may be periodically updated with dynamic (e.g., non-static) obstacle data, for example, using data provided by a garment having one or more electronic devices (e.g., cameras, ultrasonic device, and/or other sensors, to be described further herein). In various aspects, embodiments of the disclosure may be used to assist a user (e.g., a visually impaired pedestrian) to navigate along a given route to a destination, for example, by providing turn-by-turn directions (e.g., using audio signals and/or vibrational signals to the user). In another example use case, embodiments of the disclosure may enable a user to navigate to an autonomous vehicle configured to pick up and take the user to a destination without additional human intervention or assistance. For example, the device may be configured to provide directions to the user on where to stand for an autonomous vehicle to be able to pick the user up.

In some aspects, the user may configure the garment and associated devices and applications to select a route having given characteristics. For example, a user may select for a route having a crime region avoidance characteristic, which may cause the generated route to avoid areas with crime rate index higher than the user selected value. The user may also set a trip duration, which may be the maximum length of time for a trip.

FIG. 1 shows a diagram of an example environment for the use of the garment, in accordance with example embodiments of the disclosure. In one aspect, environment 100 shows a user 102. In another embodiment, the user 102 may be a visually handicapped individual. In another embodiment, the user 102 may have a mobility handicap, and may use a transportation aid (e.g., walking stick, crutch, wheelchair, or the like). In another embodiment, the user 102 may be accompanied by an individual that may aid the user 102 (e.g., a family member, a friend, and the like).

In another embodiment, visually impaired or handicapped individuals may include those individuals who have a decreased ability to see because they do not have access to glasses or contact lenses, or those that are blind. In another aspect, visual impairment may refer to a best corrected visual acuity of worse than either 20/40 or 20/60, while the term blindness may refer to individuals having complete or nearly complete vision loss. In various embodiments, visually handicapped individuals may have uncorrected refractive errors, cataracts, or glaucoma. Refractive errors may include near sighted, far sighted, presbyopia, and astigmatism. Other disorders that may cause visual handicaps may include age related macular degeneration, diabetic retinopathy, corneal clouding, childhood blindness, infections, and the like.

In another embodiment, the user 102 can wear a device, a garment 104, on their person. In another embodiment, the garment 104 may include a vest, a shirt, a sweater, or another article of clothing or a wearable item that is affixed to a portion of the user's body, for example, affixed to the chest of the user 102. In another aspect, the garment 104 may be fashionable (e.g., the garment 104 may have characteristic of, influenced by, or representing a popular trend or style). In another embodiment, the garment 104 may include reflective markers to get the attention of drivers, construction workers, and the like. In one embodiment, the garment 104 may include additional safety measures (e.g., flashing lights, sounds, etc.) so that the user 102 may be more easily noticed, for example, in dark lighting environments. The garment 104 may be equipped with a transceiver (e.g., a transceiver including an antenna and associated circuitry) to send and receive signals with a network 108 (e.g., a wireless network) over a wireless connection 110 (e.g., cellular network, WiFi network, Bluetooth network, and the like).

In another embodiment, the transceiver may include one or more location receivers (e.g., GPS receivers) that may receive location signals (e.g., GPS signals) from one or more satellites 106 and 107. In another aspect, a GPS receiver may refer to a device that can receive information from GPS satellites (e.g., satellites 106 and 107) and calculate the device's geographical position. Using suitable software, a device such as a user's device (e.g., mobile phone) may display the position on a map, and GPS receiver may offer information corresponding to navigational directions.

In another aspect, the location device may use GPS signals received from a global navigation satellite system (GNSS). In another aspect, a user device (e.g., a smart phone) may also have GPS capability that may be used in conjunction with the GPS receiver, for example, to increase the accuracy of calculating the garment's 104 geographical position. In particular, the user's device may use assisted GPS (A-GPS) technology, which can use base station or cell towers to provide a faster time to first fix (TTFF), for example, when GPS signals are poor or unavailable. In another aspect, the GPS receiver may be connected to other electronic devices on the garment (e.g., the user's device such as a smartphone). Depending on the type of electronic devices and available connectors, connections can be made through a serial or universal service bus (USB) cable, as well as a Bluetooth connection, a compact flash connection, standard (SD) connection, personal computer memory card international association (PCMCIA) connection, an ExpressCard connection, and the like.

In various embodiments, the GPS receiver may be configured to use an L5 frequency band (e.g., centered at approximately 1176.45 MHz) for higher accuracy location determination (e.g., to pinpoint the garment 104 to within 30 centimeters or approximately one foot). In another aspect, the location device may include the capability to detect location signals from one or more non-GPS based systems, for example, to increase the location accuracy determination. For example, the location device may be configured to receive one or more location signals from a Russian global navigation satellite system (GLONASS), a Chinese BeiDou navigation satellite system, a European union Galileo positioning system, an Indian regional navigation satellite system (IRNSS), and/or a Japanese quasi-zenith satellite system, and the like.

In various aspects, a network 108 may provide a connection between the garment 104 and at least one server 112. In another embodiment, the server 112 may include a remote server (e.g., a cloud-based server or a server located in a remote facility). In another embodiment, the network 108 may provide a high-speed (e.g., fiber-optic) connection to the server 112, in part to facilitate the real time communication between the garment 104 and associated devices with the server 112. In another embodiment, the server 112 may be configured to also communicate with one or more satellites 106 and 107, for example, to obtain location information (position, bearing, orientation, etc.) about the user 102, or information about the environment 100 (e.g., tree cover, buildings, obstacles, roads, bodies of water, and the like).

In another aspect, server 112 may be located at a remote site, for example, a data warehouse. The server may be in communication with the garment (e.g., garment 202), as well as one or more third party servers (not shown), and one or more user devices (e.g., user devices 220).

The server, a third-party server, one or more user devices associated with the garment, and/or the garment may be configured to communicate via one or more networks. The server may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks.

In an illustrative configuration, the server, a third party server, one or more user devices associated with the garment, and/or the garment may include one or more processors (processor(s)), one or more memory devices (also referred to herein as memory), one or more input/output (I/O) interface(s), one or more network interface(s), one or more sensor(s) or sensor interface(s), one or more transceiver(s), one or more optional display components, one or more optional camera(s)/microphone(s), and data storage. The server may further include one or more bus(es) that functionally couple various components of the server. The server may further include one or more antenna(e) that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The data storage may store computer-executable code, instructions, or the like that may be loadable into the memory and executable by the processor(s) to cause the processor(s) to perform or initiate various operations. The data storage may additionally store data that may be copied to the memory for use by the processor(s) during the execution of the computer-executable instructions. More specifically, the data storage may store one or more operating systems (O/S); one or more database management systems (DBMS); and one or more program module(s), applications, engines, computer-executable code, scripts, or the like such as, for example, one or more routing module(s). Some or all of these module(s) may be sub-module(s). Any of the components depicted as being stored in the data storage may include any combination of software, firmware, and/or hardware. The software and/or firmware may include computer-executable code, instructions, or the like that may be loaded into the memory for execution by one or more of the processor(s). Any of the components depicted as being stored in the data storage may support functionality described in reference to corresponding components named earlier in this disclosure.

In another aspect, a routing module(s) may include computer-executable instructions, code, or the like that responsive to execution by one or more of the processor(s) may perform one or more blocks of the process flows described herein and/or functions including, but not limited to, determine points of interest, determine historical user selections or preferences, determine optimal routing, determine real-time traffic data, determine suggested routing options, send and receive data, control garment features, and the like. Further, a routing module may be in communication with the garment, third party server, user device, and/or other components. For example, the routing module may send route data to the garment, receive traffic and obstacle information from the third-party server, receive user preferences, and so forth.

A navigation module(s) may include computer-executable instructions, code, or the like that responsive to execution by one or more of the processor(s) may perform functions including, but not limited to, sending and/or receiving data, determining whether a user has arrived at a given location, determining whether a user is in proximity to a given location, and the like.

In another embodiment, the network 108 may provide a connection between the garment 104 and one or more devices 114. In one aspect the one or more devices 114 may present information to additional users 120. For example, the additional users 120 may include operators at a remote site (e.g., at a company) that are in communication with the user 102 and are able to provide real time feedback to the user 102. For example, the additional users 120 may have access to data provided by the garment 102 and may use the data (e.g., camera images, location information, etc.) to guide the user 102 on a given route, supplement the instructions of the navigation system (e.g., which may include automated route information that does not capture certain nuances of navigation), or generally provide assistance (e.g., call the police if the user 102 is injured or threatened, etc.).

In another embodiment, environment 100 shows dynamic obstacles. Such dynamic obstacles may be movable and may be placed in the path of the user 102 on a given route. For example, environment 100 may include dynamic obstacles such as vehicles 122 and traffic cones 124. Other non-limiting examples of dynamic obstacles may include animals, construction sites, shopping carts, crows of people, bikes, parked motorcycles, and the like. In another embodiment, the environment 100 may include one or more static obstacles, such as buildings 126. Other non-limiting examples of static obstacles may include hospitals, schools, offices, residential homes, and the like.

In various embodiments, static and dynamic obstacles may refer to traffic control devices (e.g., markers, signs and signal devices used to inform, guide, and control traffic, including pedestrians, motor vehicle drivers and bicyclists.) In another aspect, a traffic sign may include regulatory signs, which may be traffic signs used to convey traffic rules and regulations such as intersection controls, weight limits, speed limits, one way indications, no parking zones, and the like. Further traffic signs may include warning signs that may be used to warn road users about a potential danger. These signs may be diamond in shape and, except for temporary traffic control signs, may have black legends and borders on a yellow background. Work zone signs may have orange backgrounds, and incident management signs may have pink backgrounds. Examples of warning signs include, but are not limited to, crosswalk signs, curve warning signs, intersection ahead signs, flagger signs, workers signs, or road machinery signs. In another aspect, traffic signs may include guide signs that help road users navigate to their destination. Examples of guide signs include street name signs, destination and distance signs, and place name signs. In one aspect, traffic signs may include work zone guide signs such as detour markers, length of work signs, and end road work signs.

In another aspect, static and dynamic obstacles may include traffic control devices that can be variable-message signs (VMSs). In another aspect, VMSs may include electronic traffic control signs which can exhibit different traffic messages according to the needs of a specific road or area. In another aspect, traffic control devices may include channelizing devices that may be used to warn drivers and pedestrians and to guide them through a work zone. Common channelizing devices may include traffic cones and drums. These types of traffic control devices may be placed between traffic and road construction zones, or between opposing traffic streams. Arrow boards are portable, illuminated, high-visibility panels that are used to alert motorists of an approaching lane closure and to specify the direction in which to merge.

In another aspect, dynamic obstacles may include traffic control devices that may include construction barrels or drums that may be cylindrical devices used for enhanced visibility. Such device may be made with industrial-grade orange plastic and covered with alternating orange and white retroreflective stripes.

In another aspect, dynamic obstacles may include traffic control devices that may include barricades, which may refer to channelizing devices used to redirect traffic on high-speed roads and expressways. There may be different types of barricades depending on its size, design and applications. Barricades may be portable traffic control devices. Barricades may also be used to close roads and/or sidewalks. In another aspect, the traffic control devices may include temporary raised islands, which may include pavements that are usually 4 inches (100 mm) in height and 18 inches (460 mm) wide that can be used for temporary traffic control applications.

In one aspect, static and dynamic obstacles may include the traffic control devices that may include traffic lights, which can be traffic control signals used to alternately assign right-of-way to traffic moving in conflicting directions at an intersection. Moreover, the traffic lights may include flashing beacons that are flashing signals. For example, yellow flashing beacons may be used draw attention to other traffic control devices, such as a crosswalk sign, while red flashing beacons are used to supplement stop signs. In another aspect, the traffic lights may include steady burning electric lamps which may be similar to flashing electric lights except that they may be yellow lights that are not flashing; these lights are commonly used for on-road maintenance work. In another aspect, the traffic lights include warning lights which may be are portable, battery, or solar powered lighting devices that can work as flashing or steady burning lights; such devices are commonly mounted on drums or barricades and may be considered dynamic obstacles.

Figure 2:
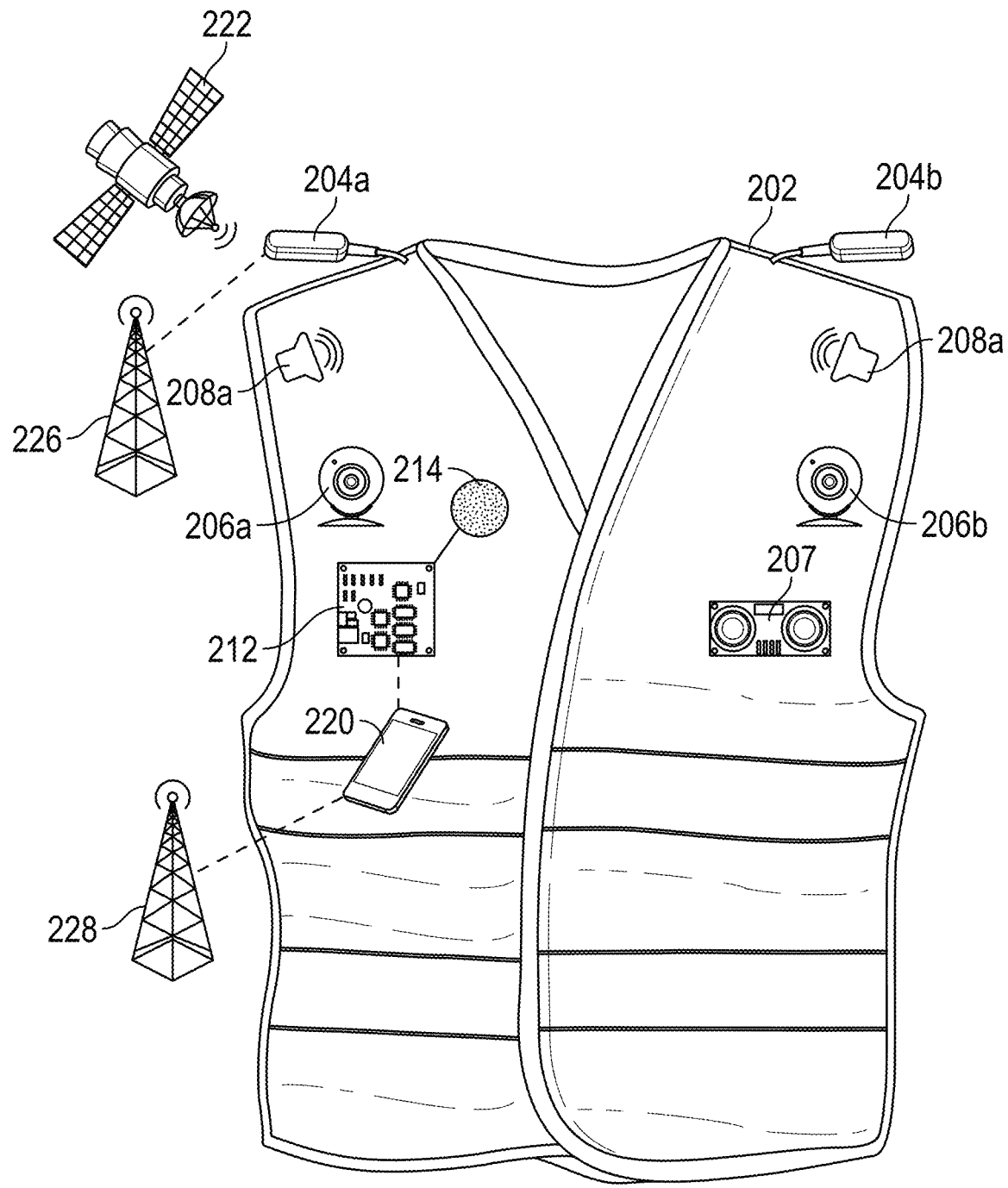
FIG. 2 shows a diagram of an example garment for navigation, in accordance with example embodiments of the disclosure.

FIG. 2 shows a diagram 200 of an example garment for navigation, in accordance with example embodiments of the disclosure. In one aspect, garment 202 may include location devices such as GPS receivers 204a and 204b. In another embodiment, the GPS receivers 204a and 204b may obtain a satellite signal to determine an approximate position of the user. In another embodiment, GPS receivers 204a and 204b may be configured to receive GPS signals from one or more satellites (e.g., similar to satellite 222). In another embodiment, there may be two GPS receivers so that the garment 202 and associated devices may be able to determine the orientation of a user (e.g., what direction the user is facing) with greater accuracy than with a single GPS receiver. For example, the GPS receivers 204a and 204b may receive one or more GPS correction signals to estimate a location of the user's position to within approximately 10 centimeters with respect to a given map, e.g., an HD map, which may have a precision at the centimeter-level. Moreover, the GPS receivers 204a and 204b and/or one or more associated backend servers (e.g., similar to servers 112 shown and described in connection with FIG. 1, above) may determine the user's orientation with respect to compass directions such as east, west, north, and south.

In another embodiment, garment 202 may include cameras 206a and 206b. In another embodiment, the cameras 206a and 206b may include stereoscopic cameras (e.g., cameras that may work together to generate a panoramic or three-dimensional representation of an environment of a user, similar to environment 100 shown and described in connection with FIG. 1). In another embodiment, there may only be a single camera, which may provide a similar panoramic or three-dimensional representation of the environment of a user, but at longer exposure times and over greater exposure angles. In another embodiment, one or more cameras 206a and 206b (e.g., a stereographic camera pair) and/or an ultrasonic sonar device 207 may be configured to detect obstacles (e.g., dynamic obstacles), and may transmit signals to other devices associated with the garment (e.g., microcontroller 212, mobile phone 220, etc.) to add the obstacles to the pre-mapped static obstacles contained in the HD map. In another embodiment, the HD map may have been previously downloaded to a user device (e.g., mobile phone 220), or may be stored on one or more remote servers (e.g. server 112 shown and described in connection with FIG. 1) in communication with one or more devices of the garment 202, or both. In another embodiment, the cameras 206a and 206b may also identify and decode aspects of static and dynamic obstacles, for example, one or more signs (e.g., traffic signs, advertisements, store fronts, and the likes) and traffic signals (e.g., traffic lights, pedestrian traffic signals, stop signs, and the like). In another embodiment, the cameras 206a and 206b may be configured to detect traffic and/or crosswalk sign states (e.g., states indicative of a time to walk or stop walking), which may not emit sounds. In another embodiment, the maps (e.g., downloaded on the user device or stored at least partially in a remote server) may include the location of the crosswalk buttons and direct the user to approach and use the crosswalk buttons as part of a navigable route.

In another embodiment, the cameras 206a and 206b on the garment 202 may periodically (e.g., every approximately 1 millisecond to approximately 100 milliseconds) take and send images to the user's device (e.g., mobile phone 220) or other devices (e.g., microcontroller 212) associated with the garment 202. The user's device 220 (and optionally, other devices associated with the garment 202) may, in combination with one or more remote computers (e.g., remote computers residing on a server 112), perform object detection and/or recognition, and may compare the recognized objects to features of the maps (e.g., HD maps). In another aspect, the cameras 206a and 206b may be referred to as object detection devices herein, and may implement artificial intelligence (AI), for example, in order to perform object detection and/or recognition (e.g., obstacle detection). Computer vision tasks may include, but not be limited to, methods for acquiring, processing, analyzing and understanding digital images and extracting high-dimensional data from the real world in order to produce numerical or symbolic information. In an aspect, the cameras 206a and 206b may be used to determine the user's position. In another embodiment, the position determined by the cameras 206a and 206b may be combined with precision GPS position information in order to provide reliable localization to help a user stay on a safe route.

In another embodiment, the garment 202 may include signal generation devices, such as speakers and/or haptic devices 208a and 208b. In another embodiment, the speakers and/or haptic devices 208a and 208b may be configured to provide vibrational and/or audio signals to the user wearing the garment 202 in order to help the user navigate a given route. For example, a first speaker and haptic device 208a may provide an audio signal that states, "take a slight turn (45 degrees) to the left," while providing a vibrational signal to a left shoulder of the user at a predetermined level of intensity. As another example the first speaker and haptic device 208a may generate an audio signal that states, "a take sharp turn (90 degrees) to the right," while providing a vibrational signal to right shoulder of the user at relatively higher intensity level. Further, another example audio signal may state, "make an urgent stop," while the speakers and/or haptic devices 208a and 208b send vibrational signals to vibrate larger areas of the garment 202 (e.g., strongly vibrate the both sides of the garment 202).

In another embodiment, one or more speaker devices of the speakers and/or haptic devices 208a and 208b may be used to play sounds to guide the user. The speakers may optionally provide spoken words (e.g., audible words synthesized by a computer) to describe the route and/or any associated obstacles (e.g., static or dynamic obstacles). In one aspect, a distance at which the sounds and/or spoken words are played via the speaker devices of the speakers and/or haptic devices 208a and 208b may be initially set at a default distance from the encountered obstacle, but may be modified by the user (e.g., during a training session to be described below, during actual use on a given route, or after using the garment on a given route). Alternatively, the garment 202 may incorporate one or more timers and/or additional sensors (not shown) which may determine the time taken for the user to react to the directions given by the garment 202 and may automatically alter the time at which the sounds and/or spoken words are presented to the user.

In another embodiment, as noted, one or more haptic devices speakers and/or haptic devices 208a and 208b (e.g., devices configured to provide vibrational sensations to a portion of the body of a user) may be used to provide feedback for the user during navigation. For example, the haptic devices may vibrate at different relative intensities to indicate the direction of an obstacle (e.g., due left or right of a given user). Moreover, the overall intensity of the vibrational signals provided by the haptic devices 208a and 208b may indicate of how close a given obstacle is from the user. Moreover, as with the sounds and/or spoken words generated by the speakers, the initiation, frequency, and/or intensity of the vibrational signals provided by the haptic devices 208a and 208b may initially be set at default values, which can be modified by the user (e.g., during a training session, during actual use on a given route, or after using the garment 202 on a given route). Alternatively, the garment 202 may determine, using one or more sensor signals in combination with map data, the time taken for a user to react to the directions given by the garment 202, and may alter the timing, frequency, and/or intensity of the vibrational signals that are presented to the user accordingly.

In another embodiment, the garment 202 may include an ultrasonic device 207, for example, an ultrasonic sonar device. In another embodiment, the ultrasonic device 207 may be configured to send and receive ultrasound signals. The ultrasound signals may be directed to one or more objects in the user's environment, and may be obtain information (e.g., distance information) about the one or more obstacles (e.g., static and dynamic obstacles) in near real time. In another embodiment, the ultrasonic device 207 may work in connection with the camera devices 206a and 206b. For example, the cameras 206a and 206b may provide a visual detection of one or more obstacles in the user's environment, while the ultrasonic device 207 determines a distance between the obstacles (or portions of the obstacles) and the user wearing the garment 202. Such information may be used to generate data for updating the map (e.g., HD map), or may be used in combination with other devices on the garment 202 to provide guidance to the user on a route.

In another embodiment, the garment 202 may include an on-board computing module 212, also referred to as a microcontroller 212 herein. In another embodiment, the microcontroller 212 may include a wireless connection (e.g., a WiFi connection, a cellular connection, a Bluetooth connection, and the like), that may allow the microcontroller 212 to send and receive information from other devices associated with the garment 202 (e.g., the user device 220 such as a phone, the microphone 214, the ultrasonic sensor 207, the cameras 206a and 206b, and/or the location receivers 204a and 204b), with one or more remote servers (e.g., similar, but not necessarily identical to, servers 112 shown and described in connection with FIG. 1), or with remote network links (e.g., towers 228 associated with cellular networks). In another embodiment, an on-board computing module may communicate sensor data (e.g., camera, GPS, ultrasonic data, and the like) with a remote computer (e.g., a cloud-based computer, not shown). In another embodiment, a user's device and/or the remote computer may calculate a modified route. In another embodiment, the modified route may be based at least in part on static obstacles and/or real-time local obstacles, which may be included on a map (e.g., an HD map) associated with user's route. In another embodiment, the connection to the remote computer may be performed through the user's device (e.g., a mobile device).

In another embodiment, the garment 202 may include a microphone 214. In another embodiment, the microphone 214 may be used to interact with the user device 220, or other devices of the garment 202 (e.g., to control cameras 206a and 206b, etc.). In another aspect, the microphone 214 may be used to request remote help (e.g., from a remote user or a device executing a corresponding AI algorithm), for example, to aid the user in interpreting what the cameras are detecting. For example, a cloud server equipped with AI capabilities or a human user may review the real time, near real time, or offline camera images or video (e.g., as uploaded by a network connection such as 4G long-term evolution, LTE, network), and may then inform the user what the cameras 206a and 206b are detecting and may provide instructions to allow the user to remain on a safe path.

In another embodiment, the garment 202 may include a mobile device 220 which may also be referred to herein as a user's device, a mobile phone, a smartphone, a cell phone, a portable device, and the like. In particular, the mobile device 220 may include other devices with remote communication abilities such as laptops, tablets, and the like. In another aspect, the mobile device 220 may transmit and receive information over a radio frequency link while the user is moving within a telephone service area. The radio frequency link establishes a connection to the switching systems of a mobile phone operator, which may provide access to a public switched telephone network (PSTN). In another aspect, the mobile device 220 may use a cellular network architecture. In addition to telephony, the mobile device 200 may support a variety of other services, such as text messaging, multimedia services (MMS), email, Internet access, short-range wireless communications (infrared, Bluetooth), business applications, video games, and digital photography.

In another embodiment, the garment 202 may be configured to communicate with one or more remote servers and/or devices (e.g., remote server 112 or shown and described in connection with FIG. 1). In another embodiment, the garment 202 may be configured to communicate with the remote servers and/or devices using a wireless connection between the user device 220 and a data connection 228 (e.g., a 4G LTE tower). In another embodiment, the data connection 228 may relay information (e.g., map data) from the remote servers and/or devices to the user device 220.

In another embodiment, the garment 202 and related algorithms and devices (e.g., cameras 206a and 206b, ultrasonic device 207, etc.) may be trained and setup by the user. In another embodiment, the training and setup may be initiated when the user obtains the garment 202 and installs an associated app (not shown) on a user device (e.g., a mobile device 220). In various aspects, training phase described herein may be an initial setup and training phase that may be performed in a familiar location to the user (e.g., a user's basement or living room), and may not necessarily require HD mapping capability or GPS availability.

In some aspects, one or more audio prompts allow the user to connect the garment 202 to the user device 220 (e.g., via a wireless network connection including, but not limited to, a Bluetooth connection, a WiFi connection, and/or cellular connection). In another embodiment, further audio prompts may provide a tutorial for the user that demonstrate aspects of the usage of the garment 202. For example, the audio prompts may inform the user as to what haptic feedback may feel like to the user, and may allow the user to adjust the haptic feedback (e.g., stronger or weaker) based on audio responses to questions posed by the garment 202. An example training session may include providing, by the one or more speakers (e.g., speakers of the speakers and/or haptic devices 208a and 208b), an audio signal that states, "a slight turn (45 degrees) to the left will feel like this," while a haptic device (e.g., a haptic device of the speakers and/or haptic devices 208a and 208b) sends a vibrational signal to a left shoulder of the user at a predetermined level of intensity. In another embodiment, the user's device 220 (e.g., a mobile phone) and/or one or more speakers (e.g., speakers of the speakers and/or haptic devices 208a and 208b) may provide verbal feedback to achieve the correct amount of turn. Another example audio signal may state, "a sharp turn (90 degrees) to the left will feel like this," while a haptic device sends a vibrational signal to left shoulder of the user at relatively higher intensity level. Further, another example audio signal may state, "an urgent stop will feel like this," while one or more haptic devices sends a vibrational signal to vibrate larger areas of the garment 202 (e.g., strongly vibrate the entire garment 202).

Alternatively, the garment 202 and related algorithms may be trained via the user demonstrating a movement (e.g., a turn), and the garment 202 may provide and confirm an appropriate corresponding amount of haptic feedback. In another embodiment, the setup and training of the garment 202 and related algorithms may include camera calibration. For example, the user may position the user device 220 (in the case of a phone-based camera) or the garment 202 (in the case of a garment-based cameras 206a and 206b) up against an object (e.g., a table, etc.), and then the user may back away by a few feet and perform a predetermined motion (e.g., turn back and forth). In another embodiment, the tutorial may recommend that the user plan a short route between two locations that the user is familiar with. Further, the user may use a cane or go on a given route with a seeing person in order to further train and test aspects of the response of the garment 202 and related algorithms. Further training and personalization of the garment 202 and related algorithms may be performed at later times, for example, using the installed mobile app. In another embodiment, additional training may be performed that takes account the expected use-case of the garment 202 (e.g., during walking or using a wheelchair).

As noted, embodiments of devices and systems (and their various components) described herein can employ AI to facilitate automating one or more features described herein (e.g., performing object detection and/or recognition, determining optimal routes, providing instructions based on user preferences, and the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 3:
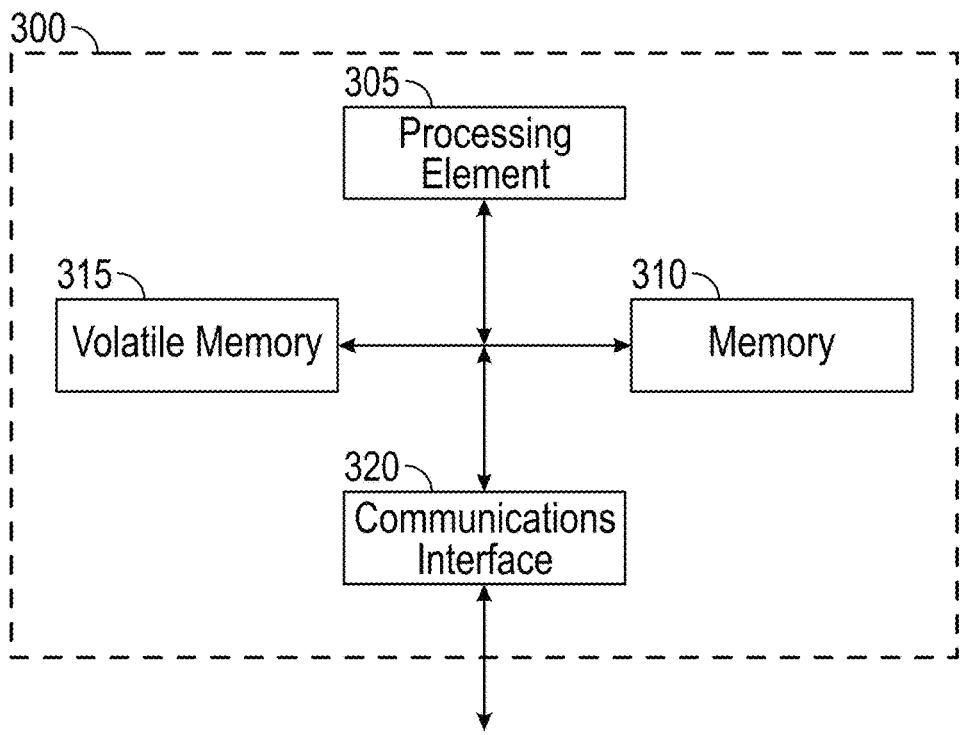
FIG. 3 provides a schematic of several computing entities associated with the garment, according to one embodiment of the present disclosure.

FIG. 3 provides a schematic of the computing entities associated with the garment 300 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the garment 300 may also include one or more communications interfaces 320 for communicating with various computing entities, such as by communicating data, content, information, and/or similar terms used herein interchangeably that can be transmitted, received, operated on, processed, displayed, stored, and/or the like. For instance, the garment 300 may communicate with user devices and/or a variety of other computing entities.

As shown in FIG. 3, in one embodiment, the garment 300 may include or be in communication with one or more processing elements 305 (also referred to as processors, processing circuitry, and/or similar terms used herein interchangeably) that communicate with other elements within the garment 300 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the garment 300 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the garment 300 may further include or be in communication with volatile media (also referred to as volatile storage, memory, memory storage, memory circuitry and/or similar terms used herein interchangeably). In one embodiment, the volatile storage or memory may also include one or more volatile storage or memory media 315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the garment 100 with the assistance of the processing element 205 and operating system.

As indicated, in one embodiment, the garment 300 may also include one or more communications interfaces 320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the garment 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

Although not shown, the garment 300 may include or be in communication with one or more input elements, such as a keyboard input, a mouse input, a touch screen/display input, motion input, movement input, audio input, pointing device input, joystick input, keypad input, and/or the like. The garment 300 may also include or be in communication with one or more output elements (not shown), such as audio output, video output, screen/display output, motion output, movement output, and/or the like.

As will be appreciated, one or more of the garment's 300 components may be located remotely from other garment 300 components, such as in a distributed system. Furthermore, one or more of the components may be combined and additional components performing functions described herein may be included in the garment 300. Thus, the garment 300 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 310 that includes one or more components that are functionally similar to those of the garment 300.

Figure 4:
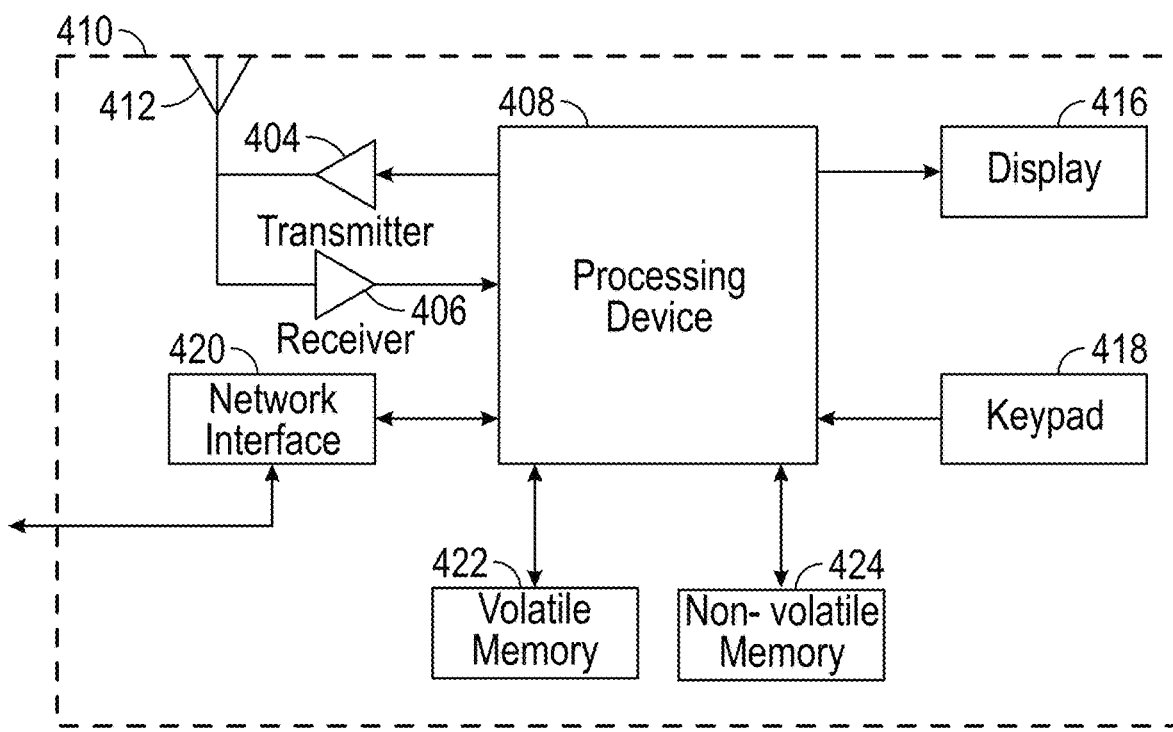
FIG. 4 provides an illustrative schematic representative of a garment and/or user device that can be used in conjunction with embodiments of the present disclosure.

FIG. 4 provides an illustrative schematic representative of a user device 410 (e.g., a smart phone) or other devices of the garment 300 (e.g., cameras, GPS receivers, ultrasonic receivers, microcontrollers, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 410 can be operated by various parties. As shown in FIG. 4, the user device 410 or other devices of the garment 300 (e.g., cameras, GPS receivers, ultrasonic receivers, microcontrollers, etc.) can include an antenna 412, a transmitter 404 (for example radio), a receiver 406 (for example radio), and a processing element 408 (for example CPLDs, microprocessors, multi-core processors, coprocessing entities, ASIPs, microcontrollers, and/or controllers) that provides signals to and receives signals from the transmitter 404 and receiver 406, respectively.

The signals provided to and received from the transmitter 404 and the receiver 406, respectively, may include signaling information in accordance with air interface standards of applicable wireless systems. In this regard, the user device 410 or other devices of the garment 300 (e.g., cameras, GPS receivers, ultrasonic receivers, microcontrollers, etc.) may be capable of operating with one or more air interface standards, communication protocols, modulation types, and access types. More particularly, the user device 410 (e.g., a smart phone) or other devices of the garment 300 (e.g., cameras, GPS receivers, ultrasonic receivers, microcontrollers, etc.) may operate in accordance with any of a number of wireless communication standards and protocols, such as those described above with regard to the garment 300. In a particular embodiment, the user device 410 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 410 may operate in accordance with multiple wired communication standards and protocols, such as those described above with regard to the garment 300 via a network interface 420.

Via these communication standards and protocols, the user device 410 (e.g., a smart phone) or other devices of the garment 300 (e.g., cameras, GPS receivers, ultrasonic receivers, microcontrollers, etc.) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 410 can also download changes, add-ons, and updates, for instance, to its firmware, software (for example including executable instructions, applications, program modules), and operating system.

According to one embodiment, the user device 410 (e.g., a smart phone) or other devices of the garment 300 (e.g., cameras, GPS receivers, ultrasonic receivers, microcontrollers, etc.) may include location determining aspects, devices, modules, functionalities, and/or similar words used herein interchangeably. For example, the user device 410 (e.g., a smart phone) or other devices of the garment 300 (e.g., cameras, GPS receivers, ultrasonic receivers, microcontrollers, etc.) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 410 position in connection with a variety of other systems, including cellular towers, Wi-Fi access points, and/or the like. Similarly, the user device 410 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 410 (e.g., a smart phone) or other devices of the garment 300 (e.g., cameras, GPS receivers, ultrasonic receivers, microcontrollers, etc.) may also comprise a user interface (that can include a display 416 coupled to a processing element 408) and/or a user input interface (coupled to a processing element 408). For example, the user interface may be a user application, browser, user interface, and/or similar words used herein interchangeably executing on and/or accessible via the user device 410 to interact with and/or cause display of information from the garment 300, as described herein. The user input interface can comprise any of a number of devices or interfaces allowing the user device 410 to receive data, such as a keypad 418 (hard or soft), a touch display, voice/speech or motion interfaces, or other input devices. In embodiments including a keypad 418, the keypad 418 can include (or cause display of) the conventional numeric (0-9) and related keys (#, *), and other keys used for operating the user device 410 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 410 (e.g., a smart phone) or other devices of the garment 300 (e.g., cameras, GPS receivers, ultrasonic receivers, microcontrollers, etc.) can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 410. As indicated, this may include a user application that is resident on the entity or accessible through a browser or other user interface for communicating with the garment 300 and/or various other computing entities.

In another embodiment, the user device 410 (e.g., a smart phone) or other devices of the garment 300 (e.g., cameras, GPS receivers, ultrasonic receivers, microcontrollers, etc.) may include one or more components or functionality that are the same or similar to those of the garment 300, as described in greater detail above. As will be recognized, these architectures and descriptions are provided for example purposes only and are not limiting to the various embodiments.

Figure 5:
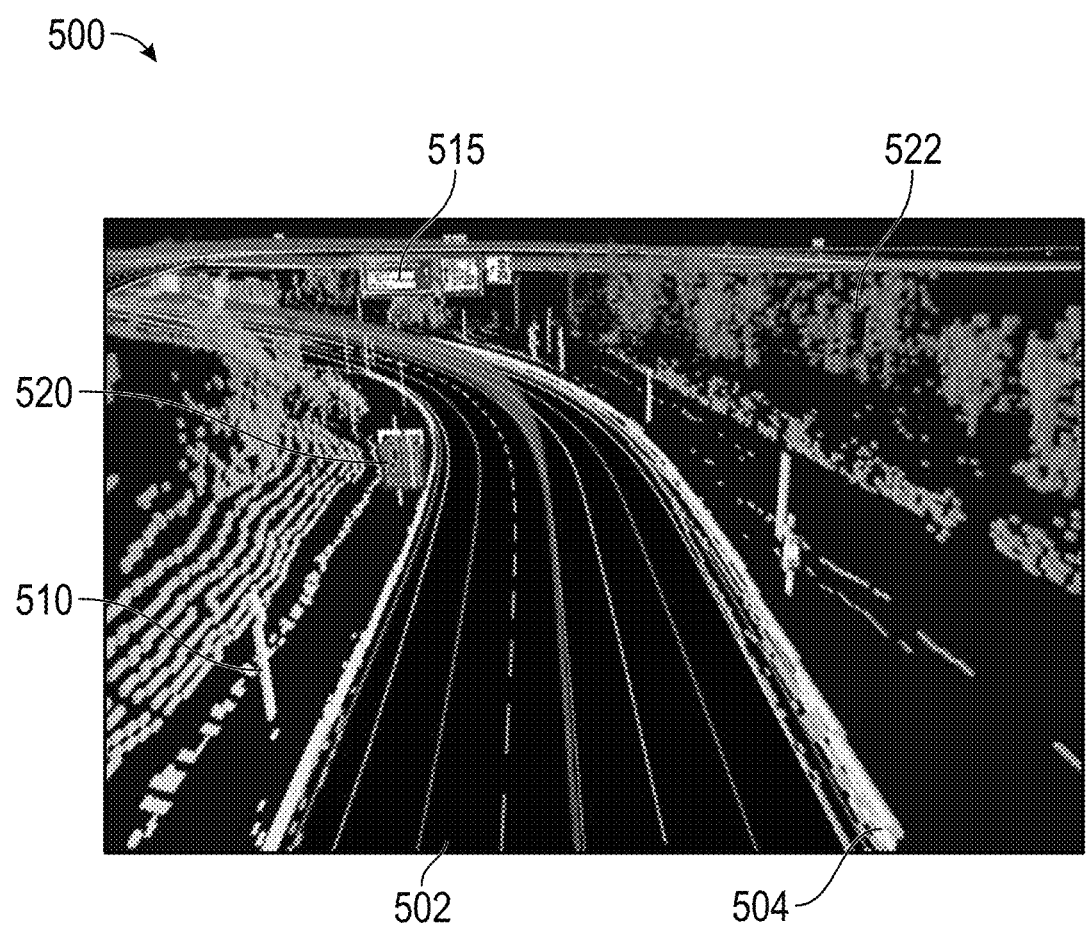
FIG. 5 shows an example of roadway data for use in connection with navigation, in accordance with example embodiments of the disclosure.

FIG. 5 shows an example diagram 500 of roadway data for use in connection with navigation, in accordance with example embodiments of the disclosure. In particular, diagram 500 represents data gathered by autonomous vehicle sensors, for example, for use in generating maps such as HD maps. In another embodiment, the data can be representative of various infrastructural components (e.g., sidewalk, crosswalk, and road shoulder areas), and may be used for mapping safe routes for users (e.g., visually handicapped pedestrians). In particular, diagram 500 shows example features of an environment such as a road 502, a shoulder of a road 504, a sign or billboard 505, one or more trees 510, one or more traffic signs 520, and one or more landscape features 522.

In another embodiment, fused data (e.g., fused data comprising camera data and LIDAR data) may be analyzed to identify various static obstacles such as infrastructural elements. Such static obstacles may include, but not be limited to, sidewalk edges, curbs, light poles, utility boxes, wheelchair ramps, open holes, uneven edges, and other potential obstacles. Moreover, the fused data may be analyzed to identify smooth, flat, safe paths to walk or move a user or a user equipment (e.g., a wheelchair). In various embodiments, by using a database of routes and permanent or semi-permanent obstacles (e.g., static obstacles) previously added to an HD map (e.g., an HD map at least partially stored and processed on a remote server in communication with a user device such as a cell phone), and by dynamically adding dynamic obstacles (e.g., traffic cones, traffic accident sites, pedestrian traffic, vehicles, etc.) as detected by sensors on the garment, the user may be kept informed about updated directions to follow in order to stay on a safe route.

Figure 6:
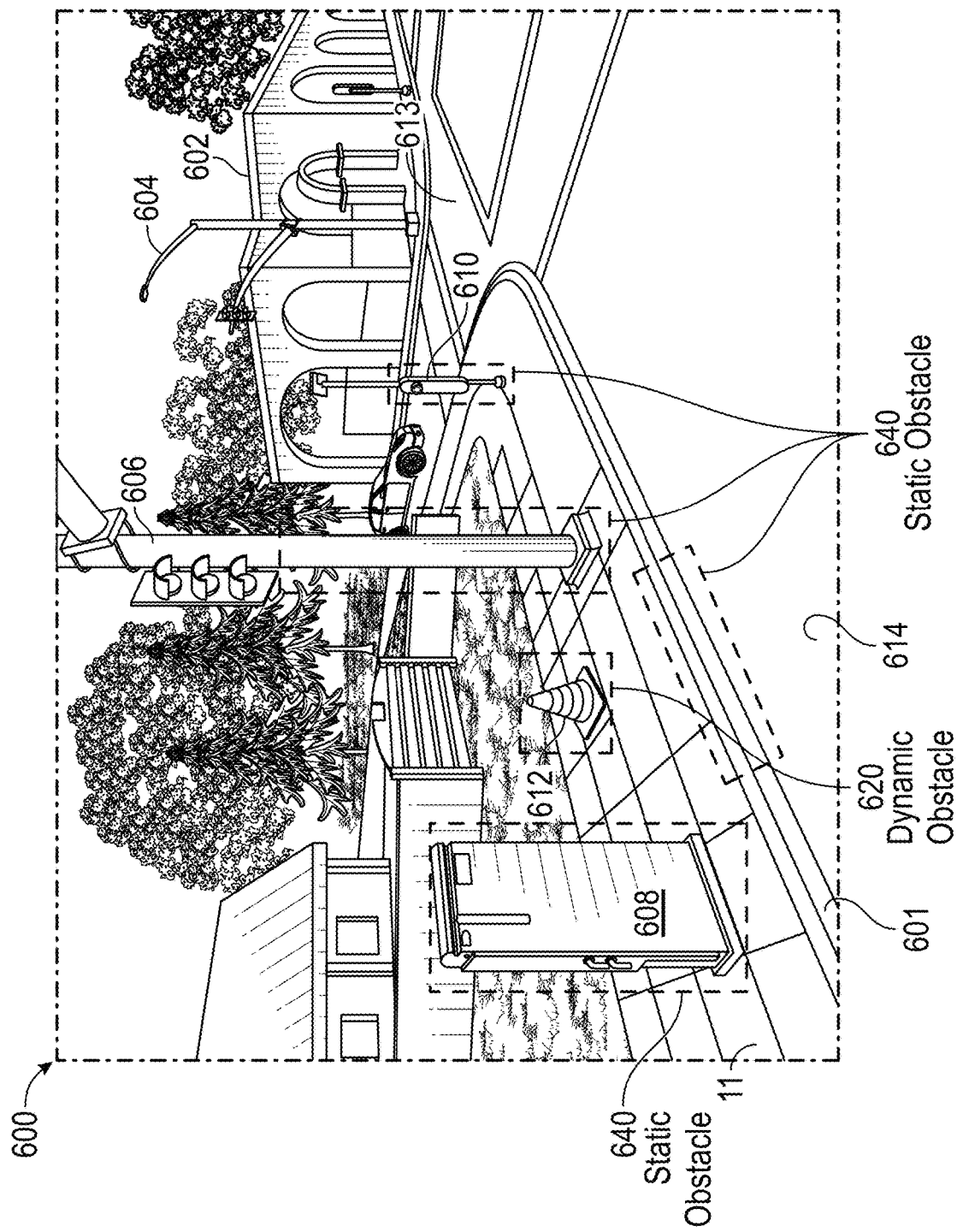
FIG. 6 shows a diagram of a physical environment including obstacles, in accordance with example embodiments of the disclosure.

FIG. 6 shows a diagram of a physical environment including obstacles, in accordance with example embodiments of the disclosure. In particular, diagram 600 illustrates section of a sidewalk 601 with a number of obstacles including examples of dynamic obstacles 620 and static obstacles 640. In another embodiment, a map (e.g., an HD map) may be generated from automobile sensor data. Moreover, the map may include locations of static obstacles (such as static obstacles traffic pole 606, power or telephone enclosure 608, parking meter 610, or sidewalk edge 614). In another embodiment, a map may include features of the environment, for example, one or more sidewalks 611 and other walkable areas such as crosswalks 613. In one aspect, one or more sensors on a garment (e.g., a garment similar to garment 202 shown and described in connection with FIG. 2, above) worn by the user (e.g., a handicapped pedestrian) may detect dynamic obstacle(s) 620 (such as traffic cone 612) in real time as such obstacles are detected by the sensors and encountered by the user. Moreover, the detected dynamic obstacle(s) 620 may be transmitted to one or more remote servers (e.g., similar to remote servers 114 shown and described in connection with FIG. 1, and received from a user device such as a mobile phone via cellular or other communication links). After processing by the remote servers, the navigation route being presented to the user may be re-routed so that the user may thereby avoid the dynamic obstacles 620.

Figure 7:
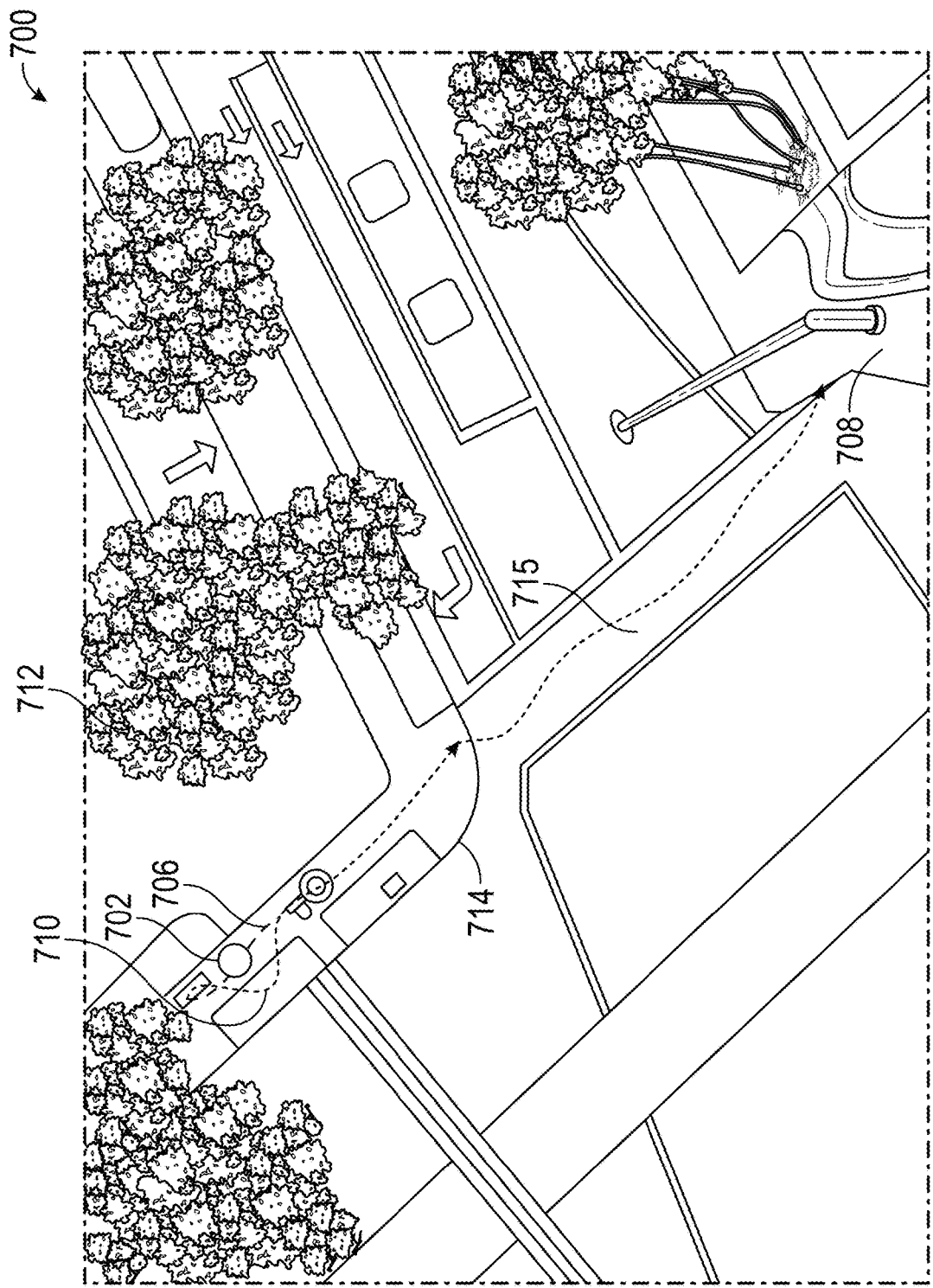
FIG. 7 shows an original planned route, a dynamic obstacle, and a modified route in a map, in accordance with example embodiments of the disclosure.

FIG. 7 shows an originally planned path, a new real-time obstacle, and a modified path which steers around the new obstacle as well as the original obstacles contained in the HD map, in accordance with example embodiments of the disclosure. In another embodiment, environment 700 represents an overhead view (e.g., of a location associated with a user on a navigable route). In another embodiment, the user may be on a first route 706 to a given destination 708. The first route 706 may need to be updated, as the user may encounter an obstacle (e.g., a dynamic obstacle) 702 on the first route 706. Accordingly, the garment (e.g., the garment 202 shown and described in connection with FIG. 2, above) may provide the user with instructions to take a second route 710 to avoid a collision with the obstacle 702. The user may then proceed along the sidewalk 714, and cross a street at a crosswalk 715 to the destination. Moreover, the garment may provide additional instructions for when to cross the crosswalk 715 (e.g., so that the user is not harmed by the flow of traffic, not shown). Additionally, the garment may detect the presence of static obstacles 712 (e.g., trees, etc.) such that the user is directed to avoid paths that would potentially collide with such obstacles.

Figure 8:
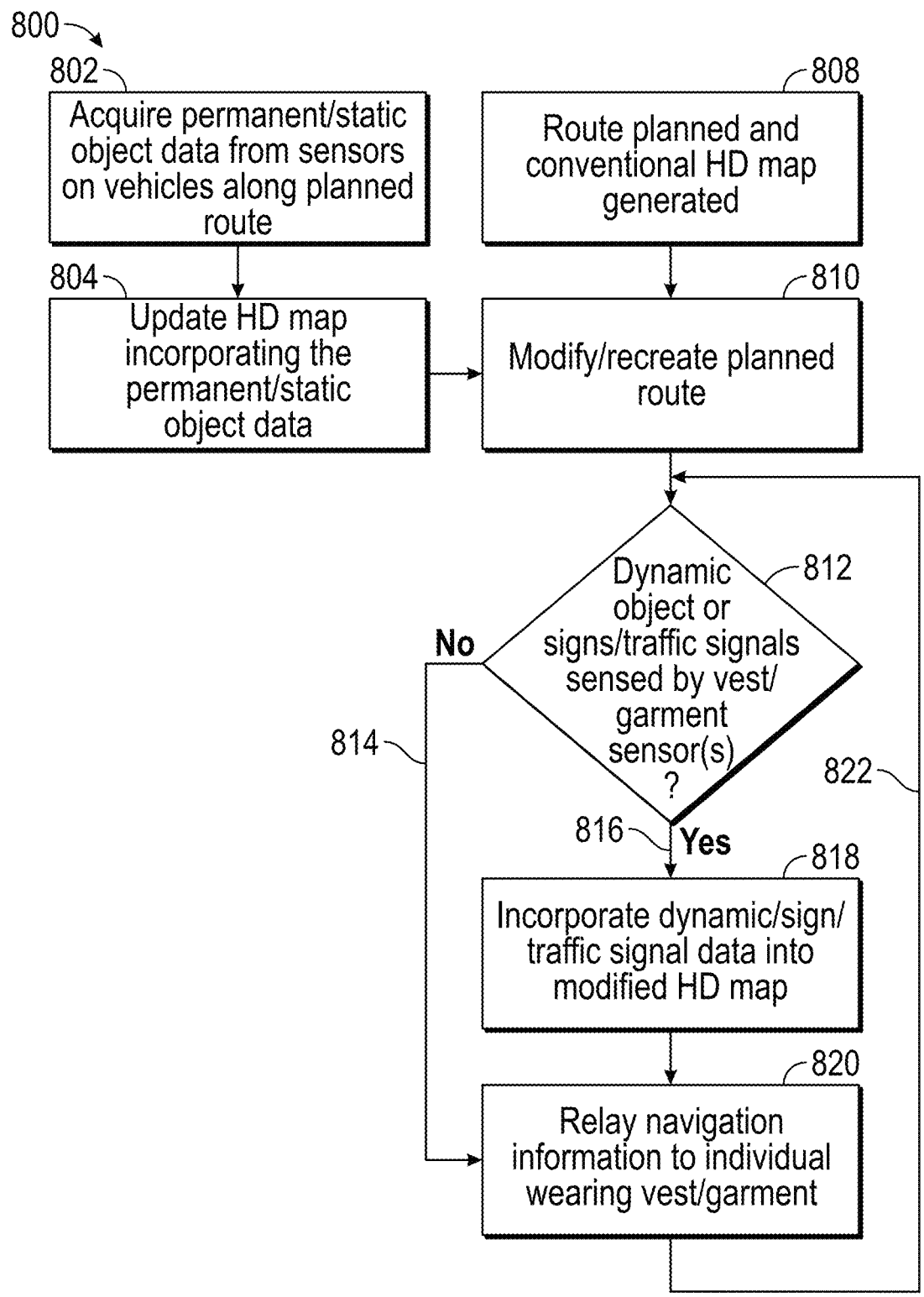
FIG. 8 shows a diagram of an example flow chart for performing example operations associated with the garment, in accordance with example embodiments of the disclosure.

FIG. 8 shows a diagram of an example flow chart for example operations of the garment, in accordance with example embodiments of the disclosure. At block 802, static (e.g., permanent or semi-permanent) object data may be determined from one or more vehicle sensors along a planned route. In another aspect, the vehicles (e.g., like autonomous vehicles) having one or more perception sensors (e.g., cameras, LiDAR, GPS, inertial measurement units (IMUs), and radars and the like) providing environmental and traffic data. In another embodiment, the data can be representative of various infrastructural components (e.g., sidewalk, crosswalk, and road shoulder areas), and may be used for mapping safe routes for users (e.g., visually handicapped pedestrians). In another embodiment, fused data (e.g., fused data comprising camera data and LIDAR data) may be analyzed to identify various static obstacles such as infrastructural elements. Such static obstacles may include, but not be limited to, sidewalk edges, curbs, light poles, utility boxes, wheelchair ramps, open holes, uneven edges, and other potential obstacles. Moreover, the fused data may be analyzed to identify smooth, flat, safe paths to walk or move a user or a user equipment (e.g., a wheelchair).

At block 804, a map (e.g., an HD map) may incorporate the static object data to update the map. In another aspect, the static object data may be transmitted by the vehicles to a remote server (e.g., similar to a remote server 114 shown and described in connection with FIG. 1, above). Additionally or alternatively, at block 808, a conventional map (e.g., non-HD map) and associated planned route may be generated. At block 810, the planned route may be modified and/or recreated. The planned route may be modified or recreated, for example, based on the static object data and using one more algorithms on the server.

At block 812, a dynamic obstacle or other traffic situation (e.g., signs, traffic signals, etc.) may be sensed by the garment at one or more sensors (e.g., cameras, ultrasonic device, etc.). If no dynamic obstacle or traffic situation is detected by the garment at block 818, the flow may proceed to block 820, described below. If such dynamic obstacle or other traffic situation is sensed by the garment, the flow proceeds 816 at block 818, the garment may incorporate the dynamic obstacle or other traffic information and thereby generate a modified map (e.g., an HD map). Further, at block 820, navigation information (e.g., updated navigation information) may be transmitted to the user wearing the garment. The flow the proceeds 822 back to block 812, where dynamic obstacle or other traffic information may again be sensed by the garment at one or more sensors while the garment is operational.

Figure 9:
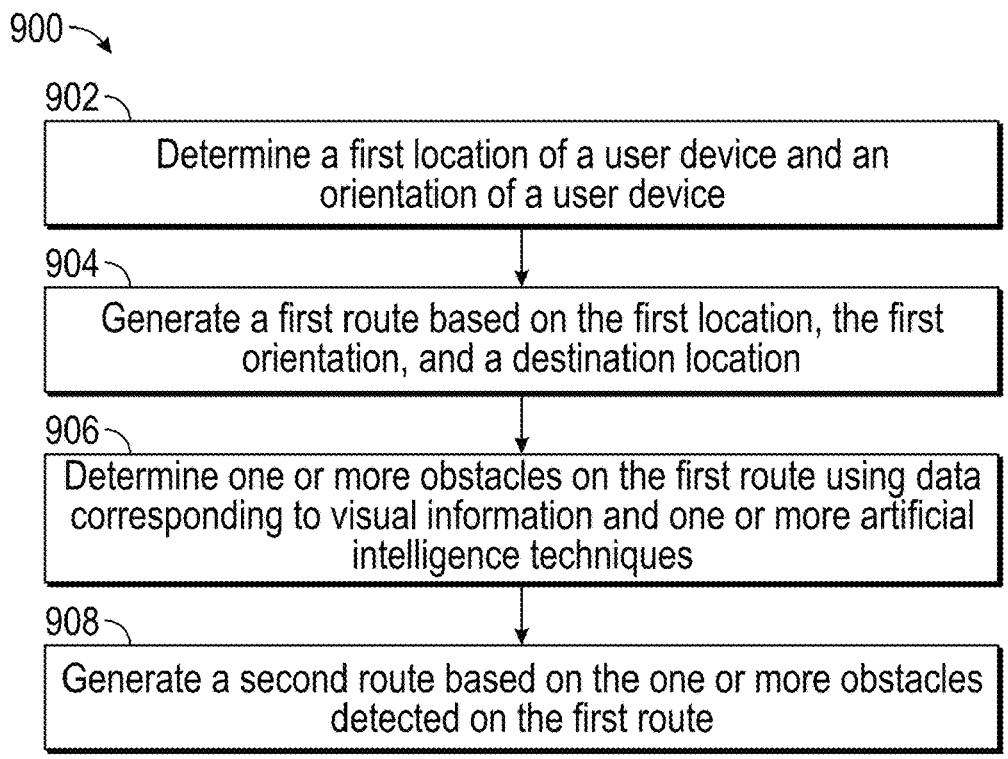
FIG. 9 shows a diagram of another example flow chart for performing example operations associated with the garment, in accordance with example embodiments of the disclosure.

FIG. 9 shows a diagram of another example flow chart for example operations of the garment, in accordance with example embodiments of the disclosure. At block 902, a first location of a user device and an orientation of a user device may be determined. In another aspect, the first location of a user device and an orientation of a user may be determined using one or more devices on a garment worn by the user. For example, one or more location receivers (e.g. GPS receivers) in combination with satellite data, ultrasound sensors, user phones in combination with cellular signals, WiFi signal, etc. and historical user locations may be used to determine the first location of a user device and an orientation of a user.

At block 904, a first route based on the first location, the first orientation, and a destination location may be generated. In another aspect, the first route may be generated by a user device (e.g., a smart phone) or a remote server, or both. In another aspect, the route may be presented to the user with audio commands from a device on the garment (e.g., speakers and haptic devices).

At block 906, one or more obstacles on the first route may be determined using data corresponding to visual information and one or more artificial intelligence techniques. In another aspect, the obstacles may include static and dynamic obstacles and may be determined by one or more devices on the garment such as with cameras in combination with machine vision, and with ultrasonic sensors. In another aspect, data related to dynamic obstacles may be transmitted to one or more remote servers to update an HD map, that may be used to generate updated routes for the user to navigate.

At block 908, a second route based on the one or more obstacles detected on the first route may be generated. In another aspect, the second route may be generated by a user device (e.g., a smart phone) or a remote server, or both. In another aspect, the second route may be presented to the user with audio commands and vibrational signals from a device on the garment (e.g., speakers and haptic devices).

Figure 10:
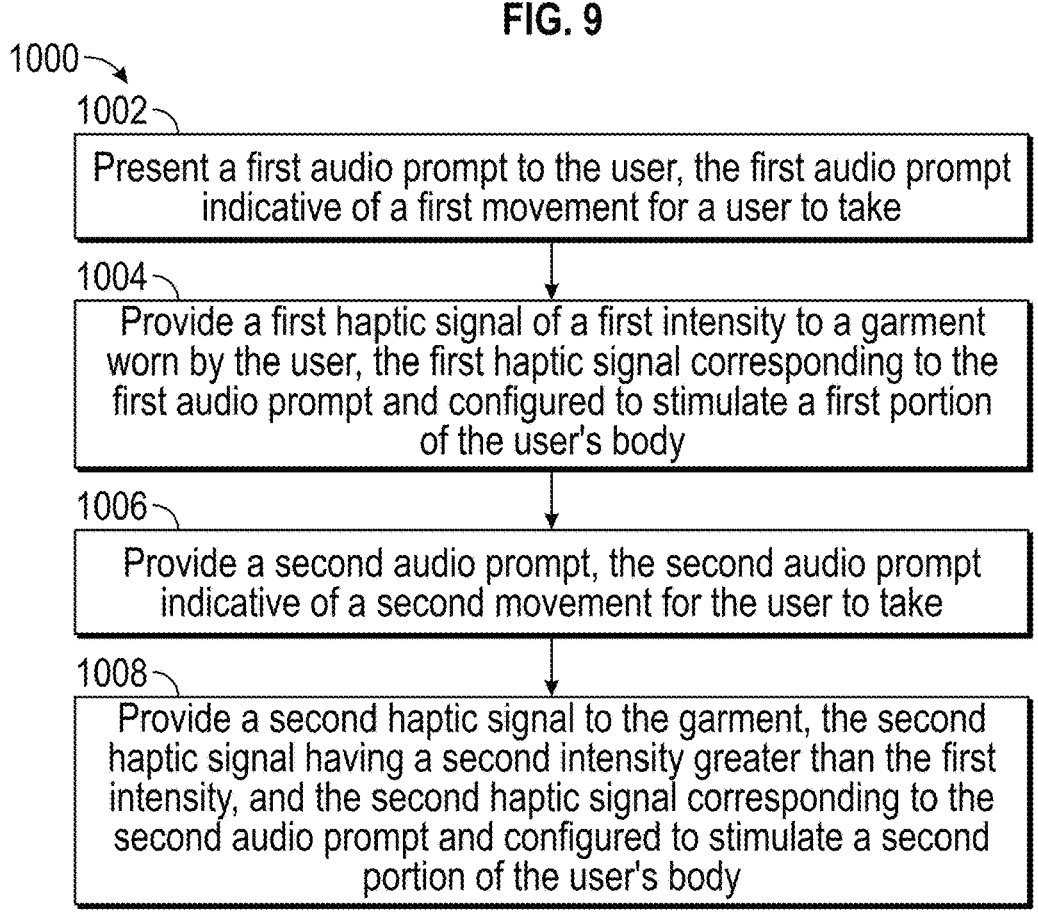
FIG. 10 shows a diagram of another example flow chart for performing example operations associated with the garment, in accordance with example embodiments of the disclosure.

FIG. 10 shows a diagram of an example flowchart for example operations for training the garment, in accordance with example embodiments of the disclosure. At block 1002, a first audio prompt may be presented to the user, the first audio prompt indicative of a first movement for a user to take. In another aspect, the first audio prompt may be played by a speaker associated with garment. In one aspect, the first audio prompt may be based on a route generated for the user to take from a source to a destination. In another aspect, the route may be based on location signals (e.g., GPS signals) received by location devices (GPS receivers and/or user devices such as smartphones) or may be based on preconfigured instructions for training purposes.

At block 1004, a first haptic signal of a first intensity may be provided to a garment worn by the user, the first haptic signal corresponding to the first audio prompt and configured to stimulate a first portion of the user's body. In one aspect, the haptic signal may include a vibrational signal. In another aspect, the haptic signal may be provided by a haptic device on the garment. In another aspect, the portion of the user's body may include, for example, a left shoulder corresponding to directions indicative of the user taking a left turn, or a right shoulder corresponding to directions indicative of the user taking a right turn.

At block 1006, a second audio prompt may be provided, the second audio prompt indicative of a second movement for the user to take. In another aspect, the second audio prompt may be played by a speaker associated with garment. In one aspect, the second audio prompt may be based on or representative of a route generated for the user to take from a source to a destination. In another aspect, the route may be based on updated location signals (e.g., GPS signals) received by location devices (GPS receivers and/or user devices such as smartphones) or may be based on preconfigured instructions for training purposes.

At block 1008, a second haptic signal may be provided to the garment, the second haptic signal having a second intensity greater than the first intensity, and the second haptic signal corresponding to the second audio prompt and configured to stimulate a second portion of the user's body. In one aspect, the haptic signal may include a vibrational signal. In another aspect, the haptic signal may be provided by a haptic device on the garment. In another aspect, the portion of the user's body may include a left shoulder corresponding to directions indicative of the user taking a left turn, or a right shoulder corresponding to directions indicative of the user taking a right turn.

In yet another aspect, the operations may include determining a user movement (e.g. a predetermined movement pattern to be performed by the user) base on received visual information (e.g., camera information), and generating haptic signals configured to stimulate the first portion or the second portion of the user's body and having an associated intensity. In another aspect, the operations may further include receiving feedback from the user, the feedback indicative of a user's preference. In various non-limiting embodiments, the user's preference may include an intensity threshold for a haptic signal. In another aspect, the user's preference may include a timing difference between a presentation of a haptic signal and a presentation of an audio prompt. Moreover, the operations may include generating third haptic signals configured to stimulate the first portion or the second portion of the user's body and having an intensity based on the user's preference.

One or more operations of the methods, process flows, and use cases of FIGS. 1-10 may be performed by one or more engines, program module(s), applications, or the like executable on electronic device. It should be appreciated, however, that such operations may be implemented in connection with numerous other device configurations.

The operations described and depicted in the illustrative methods and process flows of FIGS. 1-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Example embodiments of the disclosure may include one or more of the following examples:

Example 1 may include a system, comprising: a location device configured to determine a first location and a first orientation of a user device; an object detection device configured to detect one or more obstacles using data corresponding to visual information and an artificial intelligence technique; a memory that stores computer-executable instructions; and a processor, operably coupled to the memory, and that executes the computer-executable instructions stored in the memory to: determine, based on the first location, the first orientation, and a destination location, a first route; and determine, based one or more obstacles on the first route, a second route.

Example 2 may include the system of example 1 and/or some other example herein, wherein the location device determines the first location of the user device using global positioning system (GPS) data or data from the object detection device.

Example 3 may include the system of example 1 and/or some other example herein, wherein the one or more obstacles include static obstacles and dynamic obstacles, and the processor adds the dynamic obstacles to a map used to generate the first route or the second route.

Example 4 may include the system of example 3 and/or some other example herein, wherein the dynamic obstacles include an obstacle associated with traffic and the static obstacles include an obstacle associated with an infrastructural element.

Example 5 may include the system of example 1 and/or some other example herein, further comprising a signal generation device configured to generate a signal for presentation to a user, the signal indicative of the one or more obstacles on the first route or one or more obstacles on the second route.

Example 6 may include the system of example 5 and/or some other example herein, wherein the signal includes an audio signal or a vibration signal.

Example 7 may include the system of example 5 and/or some other example herein, wherein the signal generation device is configured to generate a signal for presentation to a user based on a distance between the user device and the one or more obstacles.

Example 8 may include the system of example 1 and/or some other example herein, wherein the data from the object detection device is transmitted to a second user device associated with a second user over a network.

Example 9 may include the system of example 8 and/or some other example herein, wherein the processor receives feedback for presentation to a user at the user device, the feedback received from the second user device.

Example 10 may include a method, comprising: determining a first location of a user device; determining a first orientation of the user device; determining a first route based on the first location, the first orientation, and a destination location; determining one or more obstacles on the first route using data corresponding to visual information and one or more artificial intelligence techniques; and determining a second route based on the one or more obstacles detected on the first route.

Example 11 may include the method of example 10 and/or some other example herein, wherein determining the first location of the user device comprises determining the first location of the user device using global positioning system (GPS) data or data from an object detection device.

Example 12 may include the method of example 10 and/or some other example herein, wherein the one or more obstacles include static obstacles and dynamic obstacles, the method further comprising adding the dynamic obstacles to a map used to determine the first route or the second route.

Example 13 may include the method of example 12 and/or some other example herein, wherein the dynamic obstacles include an obstacle associated with traffic and the static obstacles include an obstacle associated with an infrastructural element.

Example 14 may include the method of example 10 and/or some other example herein, further comprising generating a signal on the user device, the signal indicative of the one or more obstacles on the first route or the second route.

Example 15 may include a method, comprising: providing a first audio prompt, the first audio prompt indicative of a first movement for a user to take; providing, to a garment worn by the user, a first haptic signal of a first intensity, the first haptic signal corresponding to the first audio prompt and configured to stimulate a first portion of the user's body; providing a second audio prompt, the second audio prompt indicative of a second movement for the user to take; and providing, to the garment, a second haptic signal of a second intensity greater than the first intensity, the second haptic signal corresponding to the second audio prompt and configured to stimulate a second portion of the user's body.

Example 16 may include the method of example 15 and/or some other example herein, further comprising receiving feedback from the user, the feedback indicative of a user preference.

Example 17 may include the method of example 16 and/or some other example herein, wherein the user preference comprises an intensity threshold for a haptic signal.

Example 18 may include the method of example 16 and/or some other example herein, wherein the user preference comprises a timing difference between a presentation of a haptic signal and a presentation of an audio prompt.

Example 19 may include the method of example 16 and/or some other example herein, further comprising generating a third haptic signal configured to stimulate the first portion or the second portion of the user's body, the third haptic signal having a third intensity based on the user preference.

Example 20 may include the method of example 15 and/or some other example herein, further comprising: determining a user movement base on received visual information; and generating a third haptic signal configured to stimulate the first portion or the second portion of the user's body.

What is claimed is:

1. A system, comprising:
a location device configured to determine a first location and a first orientation of a user device;
an object detection device configured to detect one or more obstacles using at least one of: data corresponding to visual information or an artificial intelligence technique;
a memory that stores computer-executable instructions; and
a processor, operably coupled to the memory, and that executes the computer-executable instructions stored in the memory to:
determine, based on the first location, the first orientation, a map, and a destination location, a first route;
transmit the first location to an external device;
receive, from the external device, an updated map including one or more additional obstacles at the first location; and
determine, based on the updated map and the one or more additional obstacles at the first location, a second route.

2. The system of claim 1, wherein the location device determines the first location of the user device using global positioning system (GPS) data or data from the object detection device.

3. The system of claim 1, wherein the one or more obstacles include static obstacles and dynamic obstacles.

4. The system of claim 3, wherein the dynamic obstacles include an obstacle associated with traffic and the static obstacles include an obstacle associated with an infrastructural element.

5. The system of claim 1, further comprising a signal generation device configured to generate a signal for presentation to a user, the signal indicative of the one or more obstacles on the first route or one or more obstacles on the second route.

6. The system of claim 5, wherein the signal includes an audio signal or a vibration signal.

7. The system of claim 5, wherein the signal generation device is configured to generate a signal for presentation to a user based on a distance between the user device and the one or more obstacles.

8. The system of claim 1, wherein the second device is associated with a vehicle.

9. A method, comprising:
determining a first location of a user device;
determining a first orientation of the user device;
determining a first route based on the first location, the first orientation, and a destination location;
determining one or more obstacles on the first route using data corresponding to at least one of: visual information or one or more artificial intelligence techniques;
transmitting the first location to an external device;
receiving, from the external device, an updated map including one or more additional obstacles at the first location; and
determining, based on the updated map and the one or more additional obstacles at the first location, a second route.

10. The method of claim 9, wherein determining the first location of the user device comprises determining the first location of the user device using global positioning system (GPS) data or data from an object detection device.

11. The method of claim 9, wherein the one or more obstacles include static obstacles and dynamic obstacles.

12. The method of claim 11, wherein the dynamic obstacles include an obstacle associated with traffic and the static obstacles include an obstacle associated with an infrastructural element.

13. The method of claim 9, further comprising generating a signal on the user device, the signal indicative of the one or more obstacles on the first route or the second route.

14. A method, comprising: providing, to a garment worn by a user, a first haptic signal of, the first haptic signal configured to stimulate a first portion of the user's body, the first haptic signal being indicative of a first navigational instruction for the user, wherein the first navigational instruction is based on the first portion of the user's; and providing, to the garment, a second haptic signal, the second haptic signal configured to stimulate a second portion of the user's body, the second portion of the user's body being different than the first portion of the user's body, the second haptic signal being indicative of a second navigational instruction, wherein the second navigational instruction is based on the second portion of the user's body, and determining a user movement base on received visual information; and generating a third haptic signal configured to stimulate the first portion or the second portion of the user's body.

15. The method of claim 14, further comprising receiving feedback from the user, the feedback indicative of a user preference.

16. The method of claim 15, wherein the user preference comprises an intensity threshold for a haptic signal.

17. The method of claim 15, wherein the user preference comprises a timing difference between a presentation of a haptic signal and a presentation of an audio prompt.

18. The method of claim 14, further comprising:
providing a first audio prompt, the first audio prompt indicative of a first movement for a user to take; and
providing a second audio prompt, the second audio prompt indicative of a second movement for the user to take.

* * * * *